United States Patent
Phillips et al.

[11] Patent Number: 5,977,547
[45] Date of Patent: Nov. 2, 1999

[54] FILTER FOR ON-LINE AIR MONITOR UNAFFECTED BY RADON PROGENY AND METHOD OF USING SAME

[75] Inventors: Terrance D. Phillips, Aiken, S.C.; Howard D. Edwards, Augusta, Ga.

[73] Assignee: Westington Savannah River Company, Aiken, S.C.

[21] Appl. No.: 09/009,920

[22] Filed: Jan. 21, 1998

[51] Int. Cl.⁶ .................................................... G01T 7/04
[52] U.S. Cl. ...................... 250/393; 250/432 R; 250/435
[58] Field of Search ................................ 250/432 R, 435, 250/432 PD, 364, 255, 393

[56] References Cited

U.S. PATENT DOCUMENTS

| | | | |
|---|---|---|---|
| 4,053,775 | 10/1977 | Franklin et al. | 250/364 |
| 4,185,199 | 1/1980 | Droullard et al. | 250/435 |
| 4,426,214 | 1/1984 | Vandrish . | |
| 4,762,619 | 8/1988 | Gaddis et al. | 210/639 |
| 4,793,928 | 12/1988 | Tsukamoto et al. | 210/344 |
| 4,820,925 | 4/1989 | Balmer et al. . | |
| 4,963,730 | 10/1990 | Tetley et al. . | |
| 5,235,190 | 8/1993 | Tucker et al. | 250/435 |
| 5,372,653 | 12/1994 | Gray | 134/26 |
| 5,404,762 | 4/1995 | Rodgers et al. | 73/863.25 |
| 5,492,623 | 2/1996 | Ishibe | 210/232 |
| 5,814,118 | 9/1998 | Wickland et al. | 55/385.4 |

*Primary Examiner*—Constantine Hannaher
*Assistant Examiner*—Albert Gagliardi
*Attorney, Agent, or Firm*—Hardaway/Mann IP Group

[57] ABSTRACT

An apparatus for testing air having contaminants and radon progeny therein. The apparatus includes a sampling box having an inlet for receiving the air and an outlet for discharging the air. The sampling box includes a filter made of a plate of sintered stainless steel. The filter traps the contaminants, yet allows at least a portion of the radon progeny to pass therethrough.

A method of testing air having contaminants and radon progeny therein. The method includes providing a testing apparatus that has a sampling box with an inlet for receiving the air and an outlet for discharging the air, and has a sintered stainless steel filter disposed within said sampling box; drawing air from a source into the sampling box using a vacuum pump; passing the air through the filter; monitoring the contaminants trapped by the filter; and providing an alarm when a selected level of contaminants is reached. The filter traps the contaminants, yet allows at least a portion of the radon progeny to pass therethrough.

20 Claims, 7 Drawing Sheets

FILTER FOR ON-LINE AIR MONITOR UNAFFECTED BY RADON PROGENY AND METHOD OF USING SAME

STATEMENT AS TO RIGHTS TO INVENTIONS MADE UNDER FEDERALLY SPONSORED RESEARCH AND DEVELOPMENT

The U.S. Government has rights in this invention pursuant to the terms of contract number DE-AC09-96SR8500 between the Westinghouse Savannah River Company and the Department of Energy.

BACKGROUND OF THE INVENTION

The present invention relates to air monitors. Specifically, the present invention relates to on-line air monitors unaffected by the absence or presence of radon progeny.

Continuous air monitors are commonly used in radioactive environments. In this environment, a continuous air monitor (CAM) is located downstream of a high efficiency particulate air (HEPA) filter. When operating properly, the HEPA filter traps all of the radioactive particles therein and the CAM should detect only a minimum of radioactive particles.

However, when not operating properly, the HEPA filter may not trap all of the radioactive particles therein and the CAM will detect the radioactive particles and signal the failure of the HEPA filter.

Conventional air monitors use borosilicate glass filters. One example of the use of borosilicate glass filters is U.S. Pat. No. 4,426,214 to Vandrish. The patent discloses an air sampling device using a glass filter assembly. Plastic layers sandwich the glass fiber filter therebetween. The filter assembly is inserted into the air sampling device for monitoring radioactive particles in the air.

Borosilicate glass filters have numerous drawbacks. First, the glass filters are easily damaged during use. The glass filter can easily tear during assembly or operation. Second, the glass filter can absorb moisture and weaken. Third, the sampling device must be operated at a relatively low vacuum pressure to avoid damaging the filter. Finally, the glass filters are not reusable. Borosilicate glass filters are subjected to, for example, an acid dissolving process to determine alpha accumulation.

Our environment includes distributed particles of Radium 226. The half-life of Radium 226, 1602 years, ensures a constant release of Radon 222, its decay product. Radon 222 is a noble gas. The half-life of Radon 222 is 3.82 days. Radon 222 continuously decays into Bismouth 214 and Lead 214. Bismouth 214 and Lead 214 have half-lives of approximately 30 minutes. Bismouth 214 is a gamma emitter. Lead 214 is a beta emitter. Alpha radiation is also present during the decay of radon. Alpha radiation is present due to the presence of Polonium 218 and Polonium 214 in the decay chain.

Weather conditions influence the amount of Radon release. Fog, rain and temperature inversions, for example, increase the amount of Radon release.

Another drawback of conventional air monitors is their inability to differentiate between a naturally-occurring release of Radon progeny and a man-made release (i.e. HEPA filter failure). During certain weather conditions, the increased rate of Radon progeny release causes false alarms in conventional air monitors. Frequent false alarms can desensitize individuals. Rather than immediately responding to an alarm, an individual can become complacent, believing every alarm to be a false alarm.

One attempt to reduce false alarms involves highly complex electronics. EG&G Ortec Alpha/Beta Continuous Air Monitor model number OS3300 is such a device. The complex nature of the circuitry is inherently undesirable. In addition, the success of the device is also suspect.

Clearly, there is room for improvement in the art.

SUMMARY OF THE INVENTION

Therefore, it is an object of the present invention to provide an air monitoring device that exhibits fewer false alarms.

It is a further object of the present invention to provide a filter for an air monitoring device unaffected by the presence of Radon progeny.

It is a further object of the present invention to provide a filter less prone to damage during use in an air monitor.

It is a further object of the present invention to provide an air monitoring device using an improved method of determining accumulation of alpha particles.

It is a further object of the present invention to provide an air monitoring device which is less prone to blinding (plugging) by water or condensation.

It is a further object of the present invention to provide a reusable filter.

These and other objects are achieved by an apparatus for testing air. The air includes contaminants and radon progeny therein. The apparatus includes a sampling box having an inlet for receiving the air and an outlet for discharging the air. The sampling box includes a filter made of a plate of sintered stainless steel. The filter traps the contaminants, yet allows at least a portion of the radon progeny to pass therethrough. The portion of the radon progeny allowed to pass through the filter may approach or be approximately 100% of the radon progeny in the air.

These and other objects are achieved by a method of testing air. The method includes providing a testing apparatus that has a sampling box with an inlet for receiving the air and an outlet for discharging the air, and has a sintered stainless steel filter disposed within said sampling box. The method also includes drawing air from a source into the sampling box using a vacuum pump. The air is then passed through the filter. The filter traps the contaminants, yet allows at least a portion of the radon progeny to pass therethrough. The portion of the radon progeny allowed to pass through the filter may approach or be approximately 100% of the radon progeny in the air. The contaminants trapped by the filter are monitored and an alarm is sounded when a selected level of contaminants is reached.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION

The following description describes the present invention used during stack sampling. Applicants recognize that the present invention is not limited to use solely in stack sampling. The present invention is capable of use in other environments, for example room air sampling.

Figure 1:
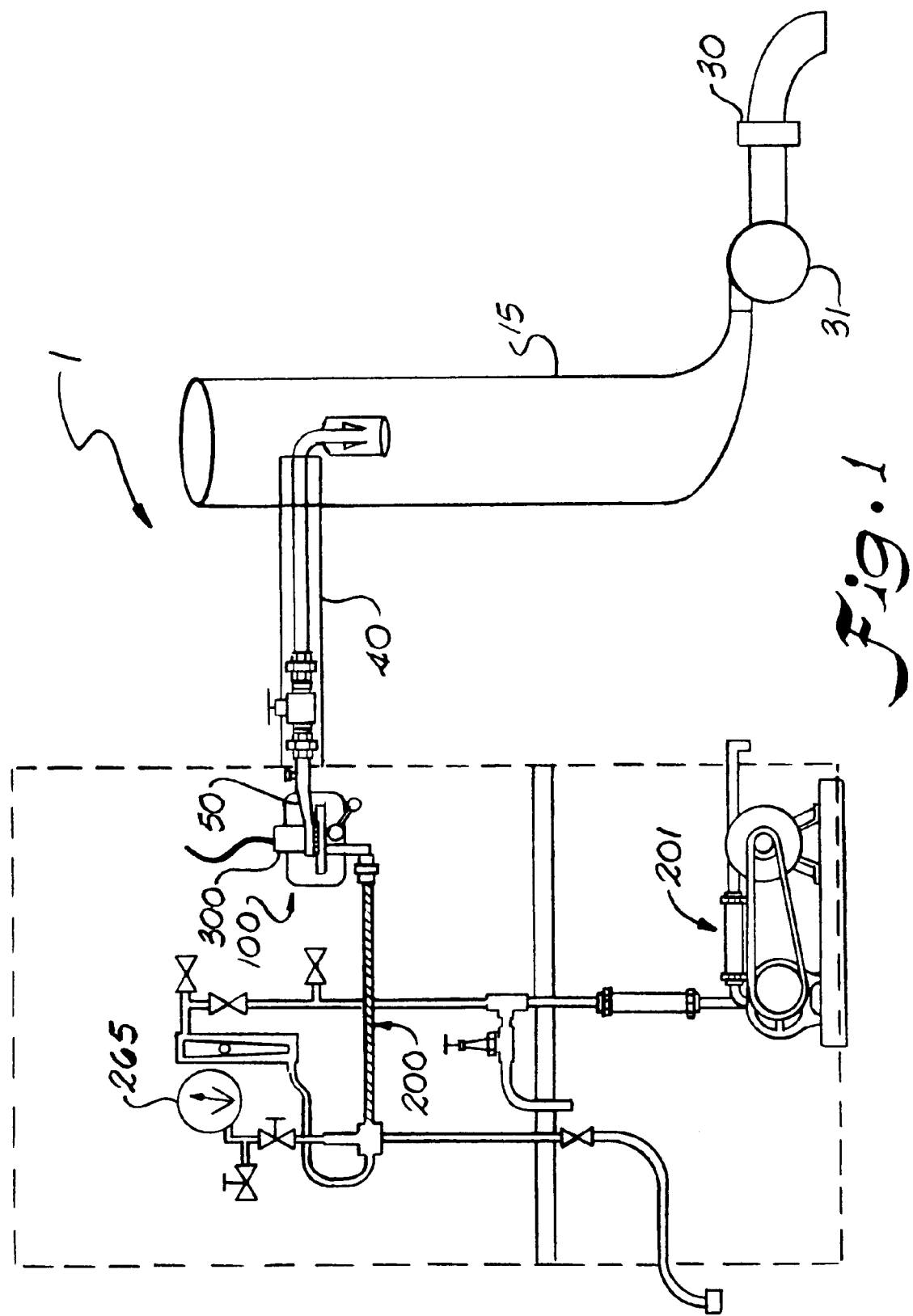
FIG. 1 is a schematic view of a typical application for a continuous air monitor utilizing the present invention.

FIG. 1 shows a schematic view of a CAM 1 utilizing the present invention. CAM 1 draws air from a ventilation stack 15 into a line 40. The sampled air travels through line 40 and enters sampling box 100 through a tapered inlet 50. The sampled air exits sampling box 100 through vacuum lines 200. A vacuum pump 201 provides the vacuum to lines 200. A radiation detector 300 signals when radioactive particles are present in the sampled air. A more detailed discussion of the various components of CAM 1 follows.

Figure 2:
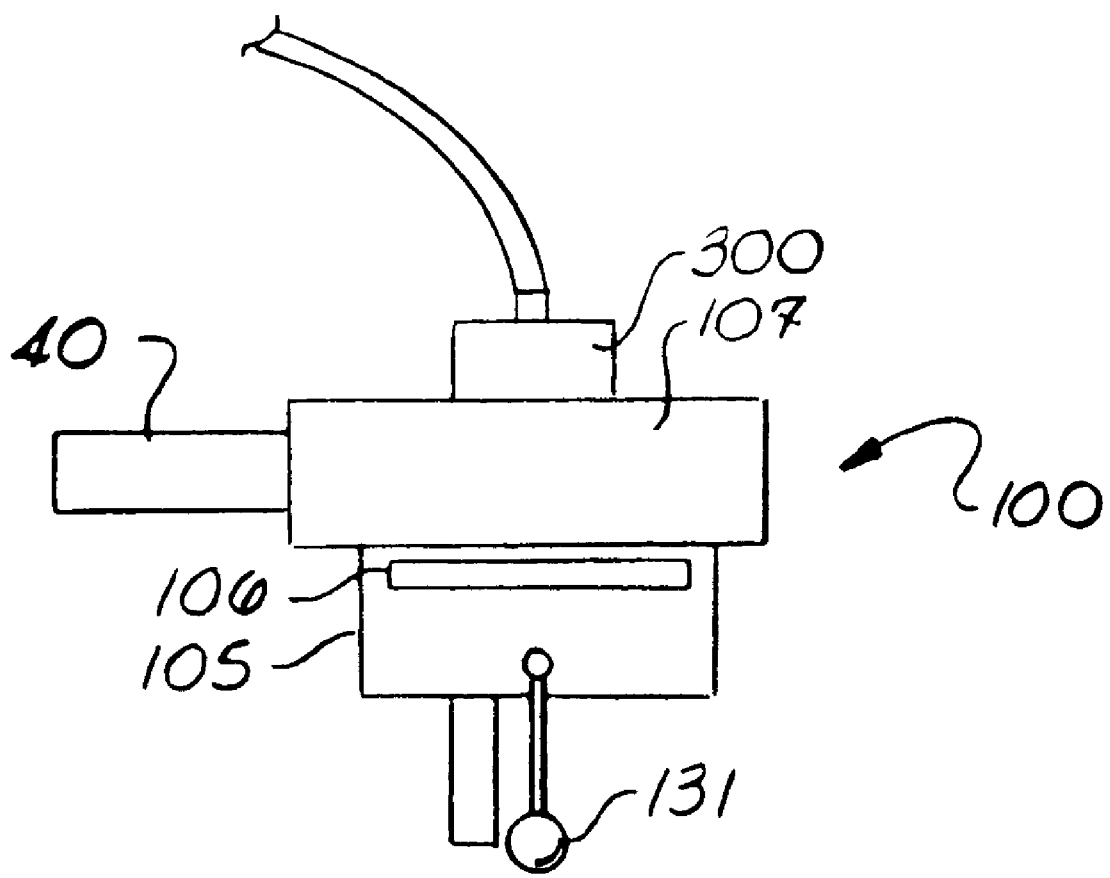
FIG. 2 is an elevational view of an air sampling box with a filter drawer for positioning the present invention within the sampling box.
Figure 3:
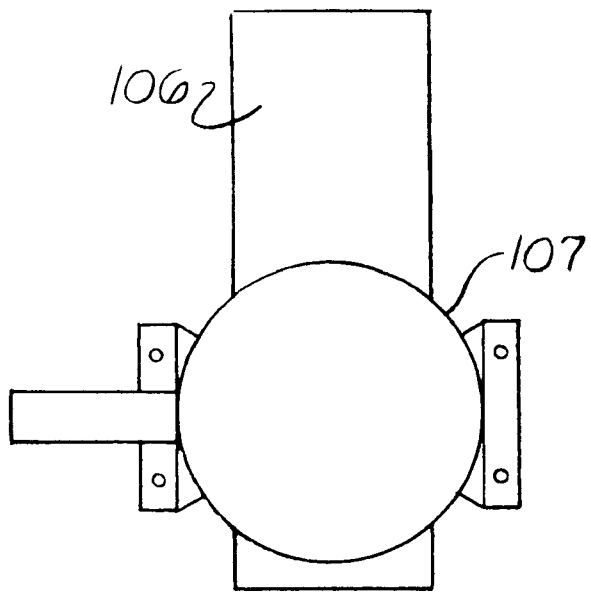
FIG. 3 is a plan view of an air sampling box with the filter drawer in a closed position.
Figure 4:
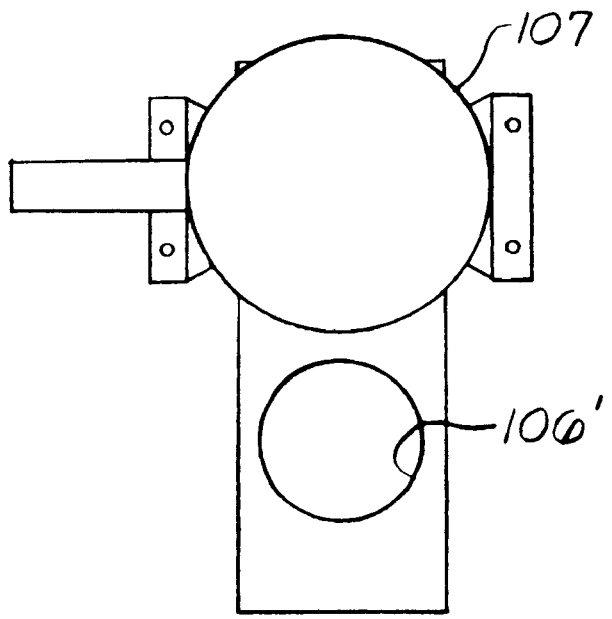
FIG. 4 is a plan view of an air sampling box with the filter drawer in an open position.

FIGS. 2–4 show various exterior views of sampling box 100. Sampling box 100 has lower body portion 105 and upper body potion 107. Body portions 105, 107 are preferably manufactured from stainless steel. Lower body portion 105 has a rectangular cut-out therethrough.

A drawer 106 is inserted into the cut-out. Drawer 106 is preferably manufactured from brass. Brass eliminates the need for lubrication of any brass-stainless steel interfaces. Furthermore, stainless steel and brass are resistant to vacuum distortion. The tolerances and precise fit between drawer 106 and lower body portion 105 are not critical. Drawer 106 has a circular aperture, or cut-out 106' on one side thereof. FIG. 3 shows drawer 106 in an operative position. When in the operative position, circular cut-out 106' is positioned within sampling box 100 and in alignment with inlet line 40 and vacuum lines 200.

FIG. 4 shows drawer 106 in an inoperative position. When in the inoperative position, circular cut-out 106' is positioned outside of sampling box 100. This allows for the replacement and/or analysis of a filter 110, described in more detail below. Drawer 106 can be made integral with lower portion 105, i.e. non-removable therefrom, if the user so desires.

Figure 5:
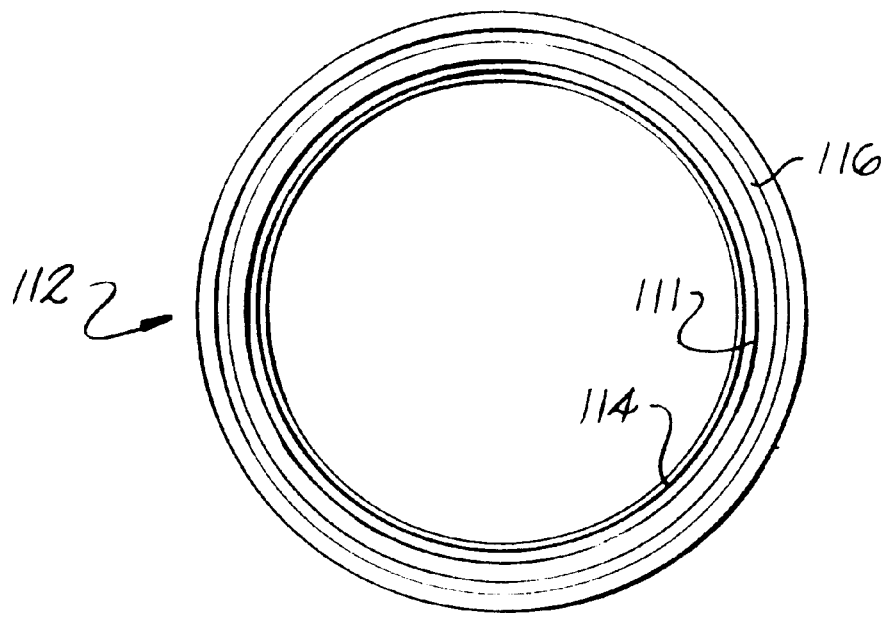
FIG. 5 is a plan view of the filter holder used to support the present invention.
Figure 6:
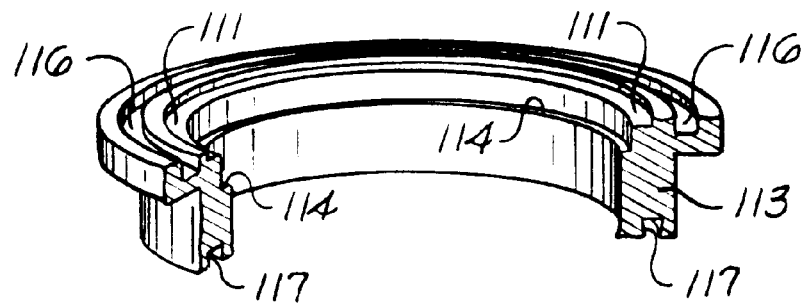
FIG. 6 is a sectional perspective view of the filter holder used to support the present invention.

Cut-out 106 accommodates a filter holder 112 therein. FIGS. 5 and 6 show a plan and a perspective sectional view, respectively, of filter holder 112. Filter holder 112 comprises a unitary annular ring 113, preferably manufactured from stainless steel. Ring 113 has various cut-outs and ledges therein. Upper cut-outs 116 and lower cut outs 117 receive O-rings 118 and 119, respectively, in such a manner that O-rings 118,119 cannot be accidentally removed. A ledges 111,114 can support a filter 110 or a filter support grid 115 as described below.

Figure 7:
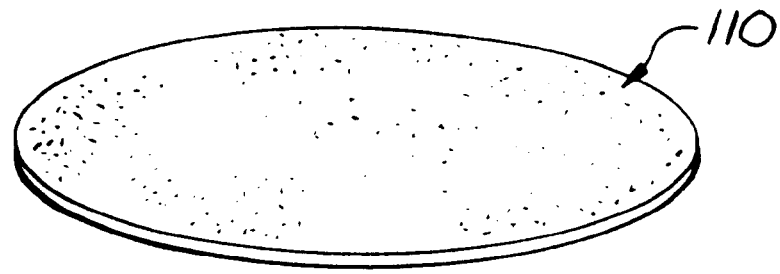
FIG. 7 is perspective view of the filter of the present invention.

FIG. 7 is a perspective view of a filter 110 of the present invention. Filter 110 is a flat disc manufactured from 1 $\mu$m sintered stainless steel particles. Filter 110 has a porosity of approximately 0.2 $\mu$m. In order to operate filter 110 in a CAM originally designed to use glass paper filters, filter 110 must approximate the size of a conventional glass filter, preferably being 3" in diameter and 0.013" in thickness. If it is desirable for filter 110 to be seated in ledge 114, then the diameter should preferably be 6.985 cm (2.75 in.).

Filter support grid 115 is a flat disc manufactured from 100 $\mu$m diameter particles of sintered stainless steel. Filter support grid 115 is preferably 6.985 cm (2.75 in.) in diameter and 0.165 cm (0.065 in.) in thickness. If used, filter support grid 115 provides subjacent support to filter 110 placed thereon. The use of filter support grid 115 causes a 0.5" Hg pressure drop when used on a sampling box drawing air at 3 cfm.

An alternative filter support grid 115' is a flat disc manufactured from plastic or steel. Filter support grid 115' includes apertures 121 therethrough to allow air to pass therethrough and into vacuum lines 200. The size and number of apertures 121 can be adjusted to achieve a desired vacuum pressure in the sampling box 100. If used, filter support grid 115' provides subjacent support to filter 110 placed thereon.

Figure 8:
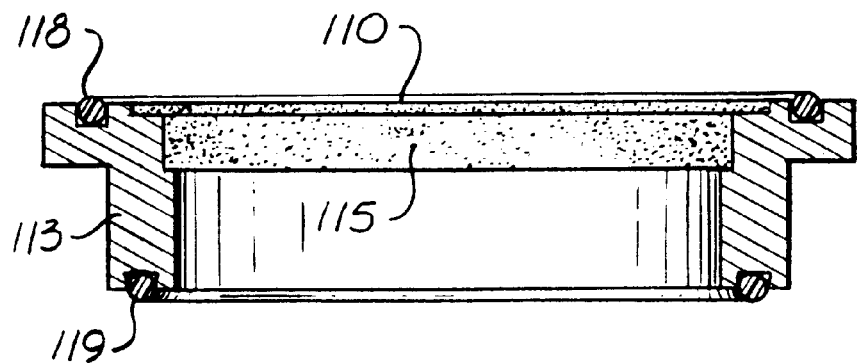
FIG. 8 is a cross-sectional view of the filter holder supporting the present invention thereon in a first arrangement.

There are several arrangements of filter 110 on filter holder 112. FIG. 8 shows a first arrangement of a filter 110 seated on filter holder 112. In this arrangement, filter holder 112 is seated on ledge 114. Filter 110 is then seated on ledge 111. Filter support grid 115 provides subjacent support to filter 110. In an alternative embodiment, an elastomeric seal (not shown) can be placed between filter 110 and filter support grid 115 to prevent air from leaking along the interface of filter 110 and filter support grid 115.

Figure 9:
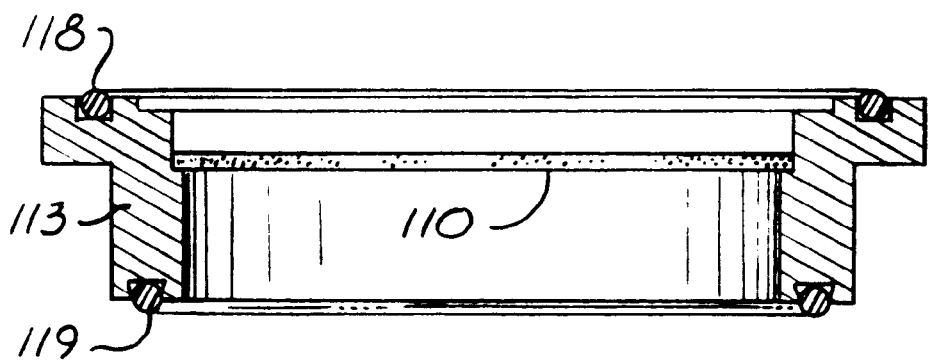
FIG. 9 is a cross-sectional view of the filter holder supporting the present invention thereon in a second arrangement.

FIG. 9 shows a second arrangement of filter 110 on filter holder 112. This arrangement does not utilize a filter holder. In this arrangement, filter 110 is seated on either ledge 111 or 114. FIG. 9 shows filter 110 seated on ledge 114. The filter 110 could also be seated on ledge 111 (not shown) with the same effect.

Figure 10:
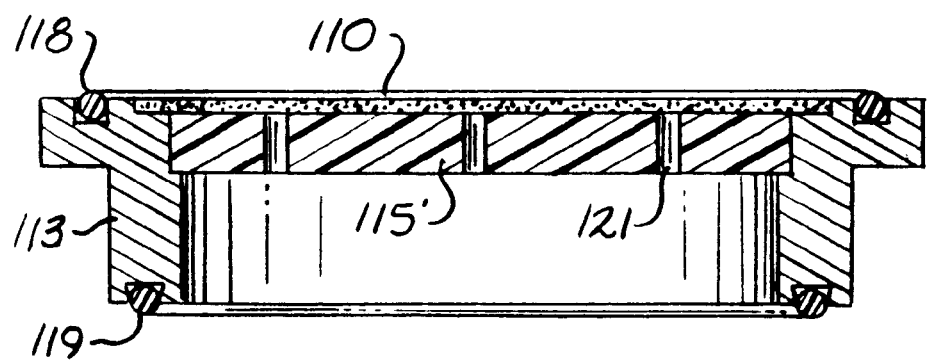
FIG. 10 is a cross-sectional view of the filter holder supporting the present invention thereon in a third arrangement.

FIG. 10 shows a third arrangement of filter 110 on filter holder 112. In this arrangement, alternative filter support grid 115' is seated on ledge 114. Filter 110 is then seated on ledge 111. Filter support grid 115' provides subjacent support to filter 110. Filter support grid is preferably manufactured from plastic. Filter support grid 115' includes apertures 121 therethrough to allow air to pass therethrough and into vacuum lines 200.

As clearly shown in FIGS. 8–10, filter holder 112 allows for rapid and uncomplicated replacement of O-rings 118, 119 and filter 110. Replacement can be accomplished by unskilled personnel without the need for tools or specialized training.

Assembly of sample box 100 will now be described. First, an operator assembles filter holder 112 according to any of the arrangements shown in FIGS. 8–10. Filter holder 112 is provided with O-rings 118, 119. If the arrangement shown in either FIG. 8 or 10 is desired, a filter support grid 115 or 115' is provided to filter holder 112. Filter 110 is then seated in one of the ledges 111,114.

Figure 11:
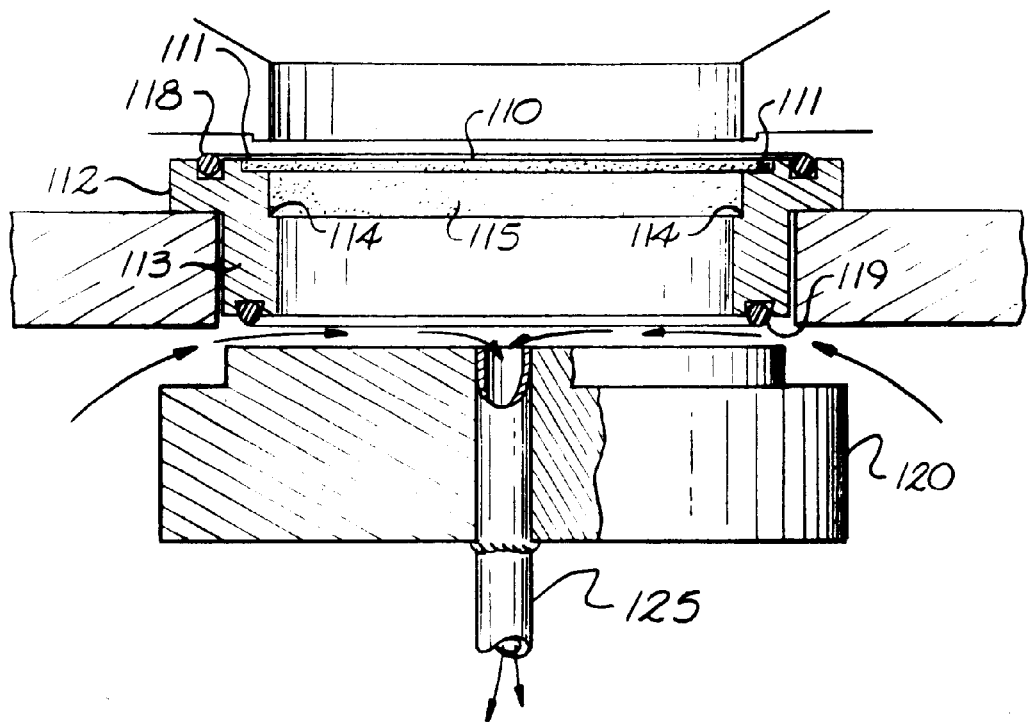
FIG. 11 is a sectional elevational view showing the details of the sampling box utilizing the present invention when the piston is in the inoperative position.

Second, an operator opens drawer 106 to expose cut-out 106' as shown in FIG. 4. FIG. 11 shows a cross-section of sampling box 100 in this inoperative position. In the inoperative position, air (from the room housing vacuum pump 201 rather than from ventilation stack 15) passes between piston 120 and lower O-ring 119. The assembled filter holder 112 is then seated in cut-out 106'. The operator then closes drawer 106 as shown in FIG. 4.

Figure 12:
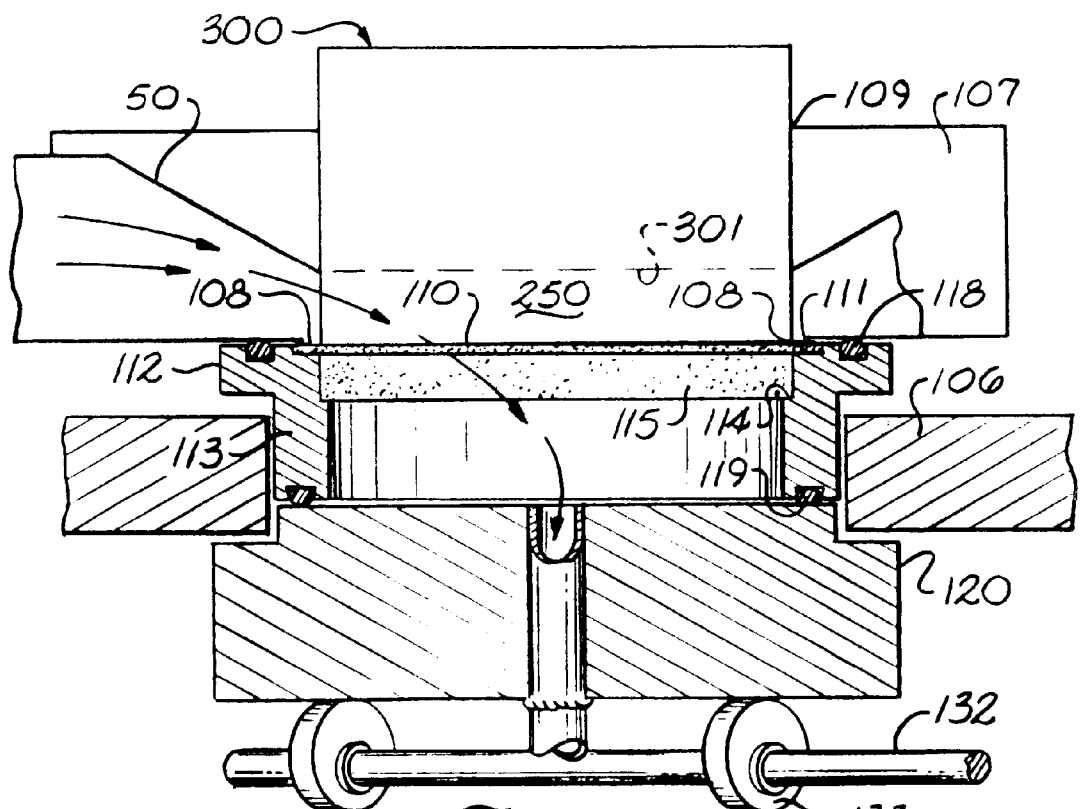
FIG. 12 is a sectional elevational view showing the details of the sampling box utilizing the present invention when the piston is in the operative position.

Finally, sampling box 100 is placed in the operative position shown in FIG. 12. The operator rotates handle 131 to lift piston 120 into contact with lower O-ring 119. Handle 131 is attached to a rod 132 having eccentric cams 133. Eccentric cams 133 abut piston 120 and force piston 120 into contact with lower O-ring 119 when handle 131 is rotated. The operator cannot lift piston 120 if drawer 106 is not fully closed. This indicates that sampling box 100 is not ready for operation. This provides a safety check.

The operator can repeat the aforementioned process in order to replace any component of sampling box 100, typically filter 110 at regular intervals and the other components as needed.

When piston 120 can be lifted, piston 120 raises filter holder 112 until upper O-ring 118 is in contact with the bottom of upper body portion 107. Filter holder 112 is compressed between piston 120 and the bottom of upper body portion 107. This seals off the passage between tapered inlet 50 and vacuum lines 200. No entrained air can leave measuring chamber 250. Sampling air enters measuring chamber 250 through tapered inlet 50. Once passing through filter 110, sampling air exits through outlet 125 and enters vacuum lines 200.

A vacuum gage 265 is provided to CAM 1 to detect leaks. As shown in FIG. 1, vacuum gage 265 can be provided downstream of sampling box 100. Should the vacuum gage detect an abnormal value, an alarm will issue indicating a problem to the operator.

In one embodiment, the bottom of upper body 107 has interferences 108 which come directly into contact with filter 110. Interferences 108 holds down and sandwiches filter 110 in the proper position shown in FIG. 12. As a result, the outermost extent of filter 110 does not lie in the flow stream. This prevents filter holder 112 from being contaminated by filter 110. This also enables the operator to remove filter 110 from filter holder 112 without a risk of contamination.

Figure 13:
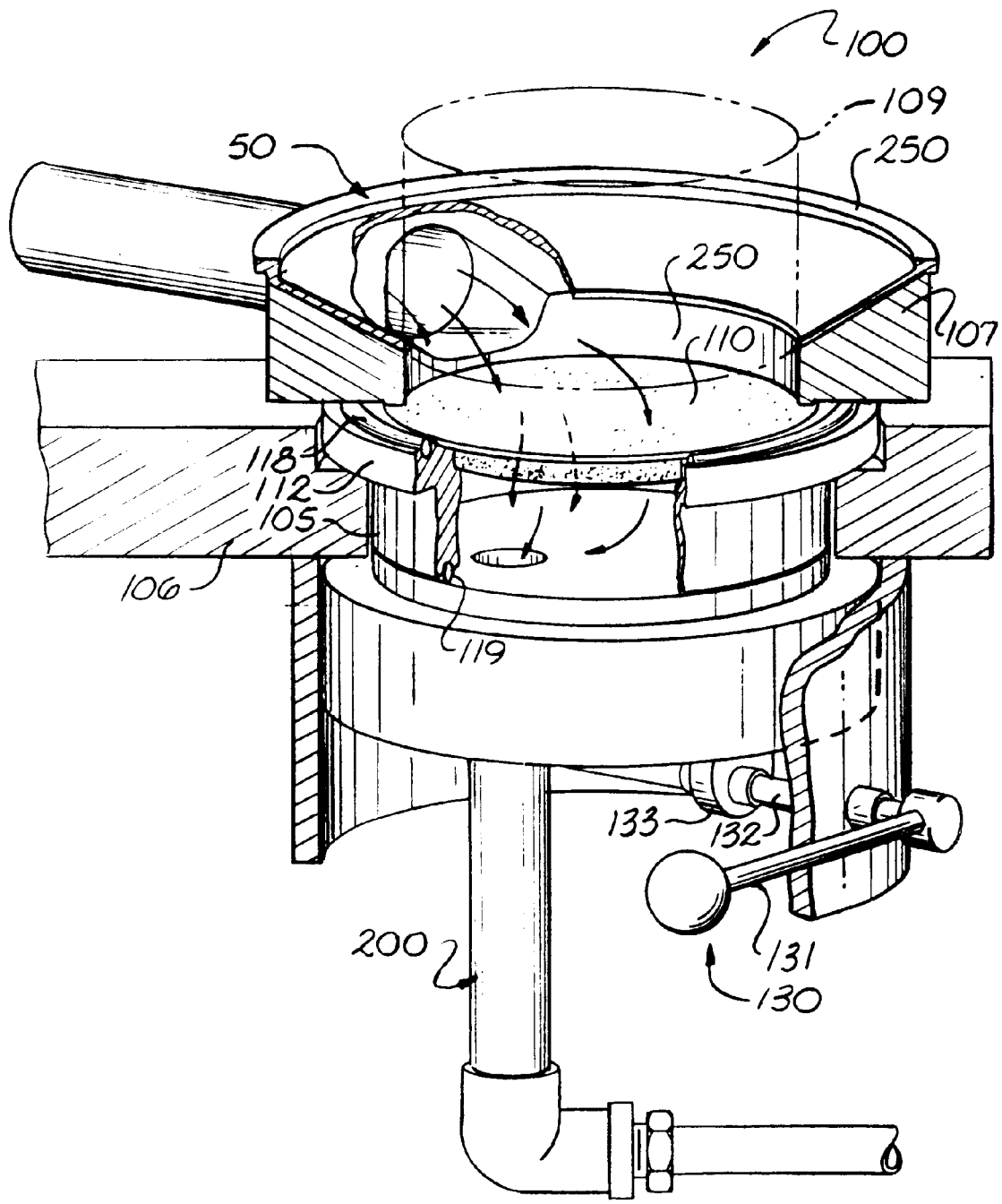
FIG. 13 is a sectional perspective view of a sampling box utilizing the present invention.

CAM 1 operates as follows, with reference to FIGS. 1 and 13. A blower 31 propels air through a ventilation stack 15. A HEPA filter 30 located upstream of blower 31 captures radioactive particles therein. Vacuum pump 201 draws a portion of the air in ventilation stack into sampling line 40. The sampling air travels along sampling line 40, passes through a tapered inlet 50 and enters a measuring chamber 250. The sampling air passes through filter 110 and enters vacuum lines 200. Filter 110 captures a representative percentage of the radioactive particles that are not captured by HEPA filter 30, i.e. during a HEPA filter failure. A radiation detector 300 monitors the buildup of radioactive particles on filter 110. Radiation detector signals an alarm when achieving a given level of buildup. Substantially all, or at least a portion of the radon progeny pass through, or into filter 110 without being trapped on the surface of filter 110.

Sampling box 100 provides real time continuous air monitoring using a radiation detector 300. Upper body portion 107 of sampling box 100 has a circular cut-out 109 therein. Circular cut-out 109 receives radiation detector 300. Radiation detector can be, for example, a conventional Geiger-Mueller (GM) tube positioned 1.27 cm (0.5 in.) above and parallel to filter 110, for providing real time, continuous air monitoring of the quantity of radioactive materials collected by filter 110. A sensitive face 301 of radiation detector 300 is protected from physical damage since face 301 is not exposed when filter holder 112 is changed. As a result, radiation detector 300 has a longer life.

Furthermore, radiation detector 300 is centered over filter 110. Face 301 is most sensitive at its center. With the instant invention, the radioactive particles are more readily deposited in the center of filter 110 due to the 30° taper of inlet 50. Circular cut-out 109 also allows for the easy replacement of radiation detectors should they become inoperative. Should radiation detector 300 detect radioactive particles, radiation detector 300 will signal an alarm.

If continuous air monitoring is not required, then sampling box 100 does not require radiation detector 300. Circular cut-out 109 can be filled by a metallic slug (not shown) rather than radiation detector 300. Filter 110 would be removed from sampling box 100 for testing. A new filter 110 would be inserted into filter holder 112 in its place.

The present invention allows vacuum pump 201 to operate at a higher pressure than vacuum pumps in conventional CAMs that utilize glass filters. Vacuum pumps of conventional CAMs draw sampling air from the ventilation stack at a rate of approximately 0.085 $m^3/m$ (3 cfm) and at a vacuum pressure of approximately 4.726. 6 Pa (1.4" Hg). Vacuum pump 201 operates at a vacuum pressure of approximately 37,145. 4 Pa (11" Hg) to maintain a sampling air withdrawal rate of approximately 0.085 $m^3/m$ (3 cfm). A sampling air withdrawal rate of between approximately 0.057 and 0.1416 $m^3/min$ (2 and 5 cfm) is also acceptable. The specific vacuum pressure depends on the porosity and diameter of filter 110, and the desired sampling air withdrawal rate.

The present invention also allows for reuse of filter 110. Conventional CAMs cannot reuse the glass filters. The methods of removing radioactive particles from conventional glass filters destroy the filter. For example, the acid dissolving process used to determine alpha accumulation destroys the filter. Clearly, once dissolved, the filter cannot be reused.

Filter 110 is capable of repeated use. The radioactive particles captured by filter 110 can be removed from filter 110 without structural damage to filter 110. The captured radioactive particles can be removed from filter 110 by, for example, ultrasonic washing. A washed filter can be reinserted into a sampling box as if it were a new filter.

The present invention can also withstand moisture. The atmosphere contains moisture which can be absorbed by conventional filters. Further, moisture may be present within the lines of CAM 1, due to condensation, etc. Conventional glass filters can be damaged when subjected to moisture. The conventional glass filter can tear, potentially causing radioactive particles to pass through the sampling box without detection.

The filter of the present invention is not critically affected by the presence of moisture. Moisture does not affect the structural integrity of filter 110 as with a conventional glass filter. The filter can still operate despite the introduction of moisture onto the filter. The filter does not require replacement as with conventional glass filters.

Most importantly, the present invention reduces the number of false alarms caused by radon progeny. Testing indicates that the present invention absorbs approximately 4.5 to 7 times less radon progeny than conventional glass filters. Testing also indicates that the present invention absorbs less radon progeny than conventional glass filters despite the filter being "wet" from moisture. The theoretical explanation for the unexpected results is that up to 50 percent less radon progeny pass through the filter, or that the metal of the filter of the present invention self-shields the activity from the radon progeny. The experiments will now be described.

All of the experiments were performed in a radon test cell. The radon test cell inserted a consistent supply of radon into a chamber. The CAM was attached to the radon test cell as if the radon test cell was a ventilation stack.

Experiments were performed to obtain measurements of radon progeny absorption by a conventional glass filter. The experiments used a conventional glass filter placed either on the aforementioned 100 μm porosity sintered stainless steel filter support grid or plastic filter support grid.

Experiments were then performed to obtain measurements of radon progeny absorption by a filter of the present invention. As discussed above, the CAM required modification from a conventional CAM. Specifically, a larger vacuum pump was required since a higher vacuum pressure is needed. These experiments used a filter of the present invention placed either on a 100 μm particle diameter sintered stainless steel filter support grid or a plastic filter support grid.

An experiment was also performed to test a water blinded filter. The experiment was identical to the experiments above using a "dry" filter. The filter in this experiment was washed with water prior to being inserted into the sampling box.

The experiments demonstrated that a filter of the present invention absorbed up to approximately 4.5 to 7 times less radon progeny than a conventional glass filter while maintaining the same efficiency. In other words, the filter of the present invention absorbed as much as 86 percent less radon progeny than conventional glass filters.

Even the water blinded filter performed better than conventional glass filters. The water blinded filter absorbed up to approximately 3 times less radon progeny than conventional glass filters. The water blinded filter did not perform as well as the "dry" filters. The water blinded filter absorbed approximately 50 percent more radon progeny than "dry" filters.

The above description is given in reference to continuous air monitors. However, it is understood that many variations are apparent to one of ordinary skill in the art from a reading of the above specification and such variations are within the spirit and scope of the instant invention as defined by the following appended claims.

We claim:

1. An apparatus for testing air, the air having contaminants and radon progeny therein, comprising:
    a sampling box having an inlet for receiving the air and an outlet for discharging the air; and
    a filter disposed within said sampling box, said filter comprising a plate of sintered stainless steel, whereby said filter traps the contaminants and allows the radon progeny to pass therethrough.

2. The apparatus for testing air as recited in claim 1, wherein said filter has a porosity of approximately 0.2 μm.

3. The apparatus for testing air as recited in claim 1, wherein said sintered stainless steel has a diameter of approximately 1 μm.

4. The apparatus for testing air as recited in claim 1, wherein said filter is a reusable filter.

5. The apparatus for testing air as recited in claim 1, further comprising a sensor attached to said sampling box for detecting contaminants on said filter.

6. The apparatus for testing air as recited in claim 1, further comprising a filter support disposed within said sampling box and supporting said filter.

7. The apparatus for testing air as recited in claim 6, wherein said filter support comprises a plate made from one of sintered stainless steel and plastic.

8. A method of testing air, the air having contaminants and radon progeny therein, comprising the steps of:
    providing a testing apparatus, said testing apparatus comprising:
        a sampling box having an inlet for receiving the air and an outlet for discharging the air; and
        a filter disposed within said sampling box, said filter comprising a plate of sintered stainless steel;
    drawing the air from a source into said sampling box using a vacuum pump;
    passing the air through said filter, whereby said filter traps the contaminants and allows the radon progeny to pass therethrough;
    monitoring the contaminants trapped by said filter; and
    signalling an alarm when a selected level of contaminants trapped by said filter is reached.

9. The method of testing air as recited in claim 8, wherein said providing step comprises providing a testing apparatus, said testing apparatus comprising:
    a sampling box having an inlet for receiving the air and an outlet for discharging the air; and
    a filter disposed within said sampling box, said filter comprising a plate of sintered stainless steel manufactured from approximately 1 μm diameter particles and having a porosity of approximately 0.2 μm.

10. The method of testing air as recited in claim 8, wherein said drawing step comprises drawing air from a source into a sampling box using a high pressure vacuum pump.

11. The method of testing air as recited in claim 10, wherein said drawing step comprises drawing air from a source into a sampling box using a vacuum pump operating at approximately 37,145.4 Pa (11" Hg).

12. The method of testing air as recited in claim 8, further comprising the steps of:
    removing said filter from said sampling box;
    cleaning said filter to remove the contaminants trapped therein; and
    replacing said filter in said sampling box.

13. The method of testing air as recited in claim 12, wherein said cleaning step comprises cleaning said filter using ultrasonic washing to remove the contaminants trapped therein.

14. The method of testing air as recited in claim 8, wherein said providing step further comprises providing a support disposed within said sampling box and supporting said filter.

15. A method of testing air from a ventilation stack, the air having radioactive particles and radon progeny therein, comprising the steps of:
    providing a testing apparatus, said testing apparatus comprising:
        a sampling box having an inlet for receiving the air and an outlet for discharging the air; and
        a filter assembly disposed within said sampling box and including a filter, said filter comprising a plate of sintered stainless steel having a porosity of approximately 0.2 μm;

drawing the air from a ventilation stack into said sampling box using a vacuum pump;

passing the air drawn into said sampling box through said filter assembly, whereby said filter traps the contaminants and allows the radon progeny to pass therethrough;

monitoring the radioactive particles trapped by said filter; and signalling an alarm when a selected level of radioactive particles trapped by said filter is reached.

16. The method of testing air from a ventilation stack as recited in claim 15, wherein said drawing step comprises drawing air from the ventilation stack into a sampling box using a high pressure vacuum pump.

17. The method of testing air from a ventilation stack as recited in claim 16, wherein said drawing step comprises drawing air from the ventilation stack into a sampling box using a vacuum pump operating at approximately 37.145.4 Pa (11" Hg).

18. The method of testing air from a ventilation stack as recited in claim 15, further comprising the steps of:

removing said filter from said sampling box;

cleaning said filter to remove the radioactive particles trapped therein; and replacing said filter in said sampling box.

19. The method of testing air from a ventilation stack as recited in claim 18, wherein said cleaning step comprises cleaning said filter using ultrasonic washing.

20. The method of testing air from a ventilation stack as recited in claim 15, wherein said providing step comprises providing a testing apparatus, said testing apparatus comprising:

a sampling box having an inlet for receiving the air and an outlet for discharging the air; and a filter assembly disposed within said sampling box and including a filter, said filter comprising a plate of approximately 1 $\mu$m diameter sintered stainless steel having a porosity of approximately 0.2 $\mu$m.

* * * * *

UNITED STATES PATENT AND TRADEMARK OFFICE
CERTIFICATE OF CORRECTION

PATENT NO. : 5,977,547
DATED : November 2, 1999
INVENTOR(S) : Terrance D. Phillips and Howard D. Edwards It is certified that error appears in the above-identified patent and that said Letters Patent are hereby corrected as shown below:

Please correct the spelling of Assignee, Item [73], on the face of the patent to read "Westinghouse Savannah River Company".

Signed and Sealed this

First Day of May, 2001

Attest:

NICHOLAS P. GODICI

Attesting Officer     Acting Director of the United States Patent and Trademark Office